United States Patent
Edelen et al.

(10) Patent No.: US 6,702,713 B2
(45) Date of Patent: *Mar. 9, 2004

(54) SHIFT STRATEGIES FOR MOCK CONTINUOUSLY VARIABLE TRANSMISSION

(75) Inventors: Stephen A. Edelen, Battle Creek, MI (US); Timothy J. Morscheck, Portage, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/032,173

(22) Filed: Dec. 21, 2001

(65) Prior Publication Data

US 2003/0119630 A1 Jun. 26, 2003

(51) Int. Cl.[7] .......................... B60K 41/02; B60K 42/24
(52) U.S. Cl. .......................... 477/78; 701/56; 74/336 R
(58) Field of Search .............. 701/56; 477/78; 74/336 R

(56) References Cited

U.S. PATENT DOCUMENTS

| 4,576,065 A | * | 3/1986 | Speranza et al. | 477/78 |
| 4,698,763 A | * | 10/1987 | Smyth | 701/56 |
| 5,711,712 A | * | 1/1998 | Graf | 477/78 |
| 5,948,034 A | * | 9/1999 | Tihanyi et al. | 701/56 |
| 6,085,606 A | | 7/2000 | Stine et al. | |

FOREIGN PATENT DOCUMENTS

WO  WO 00/31442  6/2000

OTHER PUBLICATIONS

International Search Report, 4 pages.

* cited by examiner

Primary Examiner—Dirk Wright
(74) Attorney, Agent, or Firm—Rader, Fishman & Grauer PLLC

(57) ABSTRACT

Simulated or "mock" continuously variable transmission shift strategies are used in an electromechanically actuated automotive transmission having reduced ratios steps in its upper ratio ranges. In one described embodiment, a 12-speed truck transmission consists of a five-speed main section and an auxiliary section that includes splitter and range subsections to provide the 12 ratios. Separate shift strategies are directed to fuel economy and power optimization modes; driver throttle demand determines the mode. Both strategies are targeted to the upper gear ratios, which represent the ratios subject to approximately ninety percent (90%) of vehicular operation. In the described embodiment, the applicable affected ratios are gears 7–12. In the described embodiments, the shift strategies are carried out by embedded software subject to the command of an electronic power train control module. Both strategies are operated as direct functions of engine torque, transmission input shaft speed, and road speed.

29 Claims, 8 Drawing Sheets

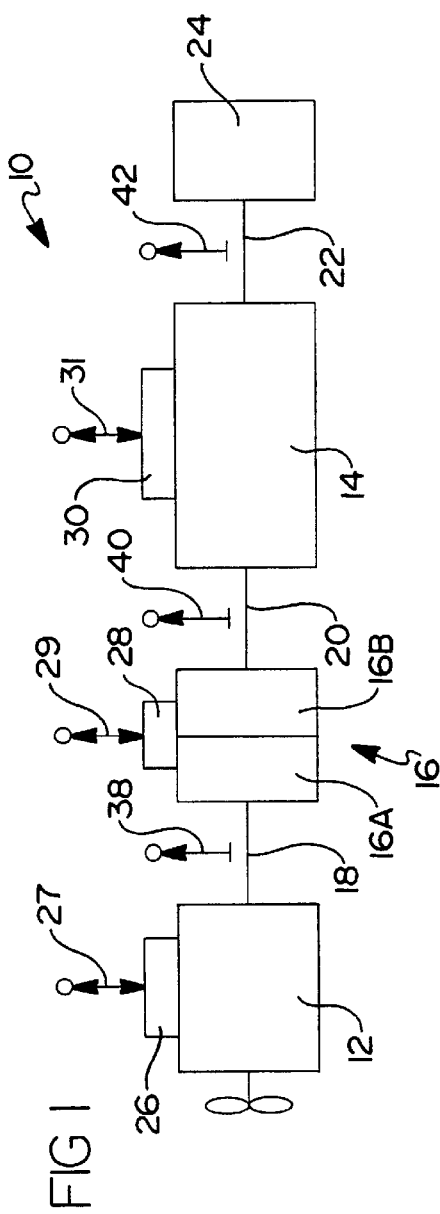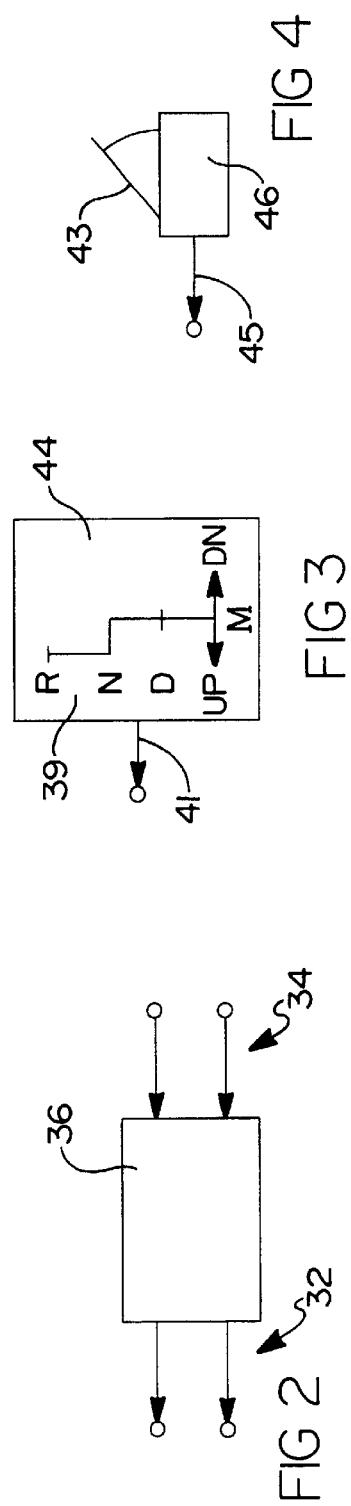

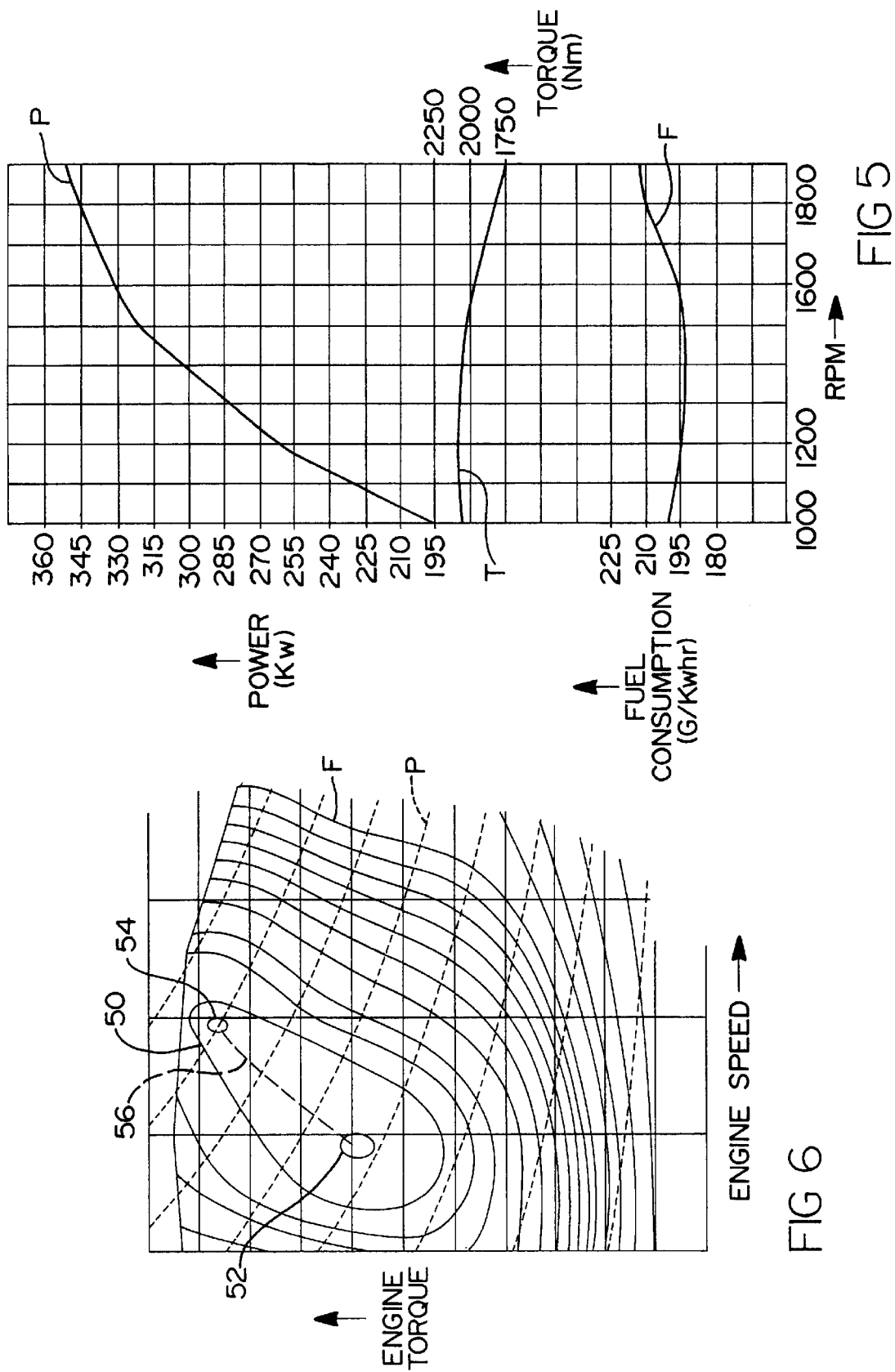

SHIFT STRATEGIES FOR MOCK CONTINUOUSLY VARIABLE TRANSMISSION

BACKGROUND OF THE INVENTION

1. Field of Invention

This invention relates generally to improvements in operability of vehicular transmissions. More particularly, the invention relates to improvements in transmission shift strategies, and commensurately to enhancement of transmission performance parameters over a relatively wide range of road speeds and hill grades.

2. Description of the Prior Art

Automatically actuated electromechanical transmissions include actuation software modules of the embedded type, generally including data connection links with engine control modules. Their automatic shift strategies tend to be based on protocols limited to functions of driver throttle demand, engine speed, and torque. Several issues work against ideal performance and operation of transmissions when so limited. For example, the operation of the transmission is essentially a balance or blend between the economic usage of fuel and optimal performance demands. An obvious limitation is that the typical control module has no options with respect to selectively optimizing fuel economy versus optimizing power usage as separate choice modes.

In addition, an approach based upon balancing fuel economy and power optimization targets actually falls short of objectives desired by most fleet operators. To the extent that highway line haul vehicles spend approximately ninety percent (90%) of their operations in upper gear ratios, there are now available transmissions that provide relatively small average ratios steps between the highest gears. Such a transmission is fully described in U.S. Pat. No. 6,085,606, issued Jul. 11, 2000 to Stine et al., and is hereby incorporated by reference. The approach of making the ratio steps relatively small between the highest gears recognizes that in the operation of the vehicle on flat surfaces or relatively small grades, smaller ratios changes can improve overall efficiencies and operating characteristics of the vehicle. On the other hand, where higher hill grades are encountered, a more optimal power mode is normally desirable. An improvement wherein choice of fuel economy mode or performance optimization mode is provided is seen as beneficial, and entirely within the practical limits and/or feasibility of today's vehicular systems, especially those of on-highway trucks.

SUMMARY OF THE INVENTION

The present invention offers an improved operation of a vehicular transmission control module by providing a choice of shift strategies for the operator, particularly as a function of driving conditions encountered. In the described embodiment, two separate shift strategies are presented; one directed to fuel economy, the other to power optimization. The control module is configured to simulate or "mock" the performance of a continuously variable transmission in upper gear ratios of the transmission. Thus, the two shift strategies are particularly suitable for use in an electromechanically actuated automotive transmission having reduced ratios steps in its upper ratio ranges.

In one described embodiment, a 12-speed truck transmission consists of a five-speed main section and an auxiliary section including splitter and range sub-sections adapted to provide the twelve ratios. Both strategies are targeted only to upper gear ratios, which represent the ratios experienced in approximately ninety percent (90%) of the operating cycles of on-highway trucks. In the described embodiment, the applicable ratios are gears 7–12, having relatively small ratio step changes between them, and the shift strategies are carried out by embedded software subject to the command of an electronic control module of an associated vehicular engine. Both strategies are operated and measured as direct functions of developed engine power, engine torque, transmission input shaft speed, and road speed.

BRIEF DESCRIPTION OF THE DRAWINGS

FIG. 1 is a schematic illustration of a vehicular power train that employs an improved transmission operating system of the present invention.

FIG. 2 is a schematic view of one embodiment of an electronic control module employed in the vehicular power train of FIG. 1.

FIG. 3 is a plan view of a driver control console depicting transmission gear ratio selections employed in the operation of the power train of FIG. 1.

FIG. 4 is a schematic view of a throttle position sensor and an associated throttle pedal employed in the operation of the power train of FIG. 1.

FIG. 5 is a chart of three curves associated with one example of the operation of the power train of the present invention, separately depicting engine power, engine torque, and fuel consumption; each individually represented as a function of engine rpm.

FIG. 6 is graph depicting fuel consumption as a function of engine torque vs. engine speed, and depicting two distinct "sweet spots" of operation depending on whether the selected strategy is fuel optimization or maximum power.

DETAILED DESCRIPTION OF THE EMBODIMENTS

Figure 7:
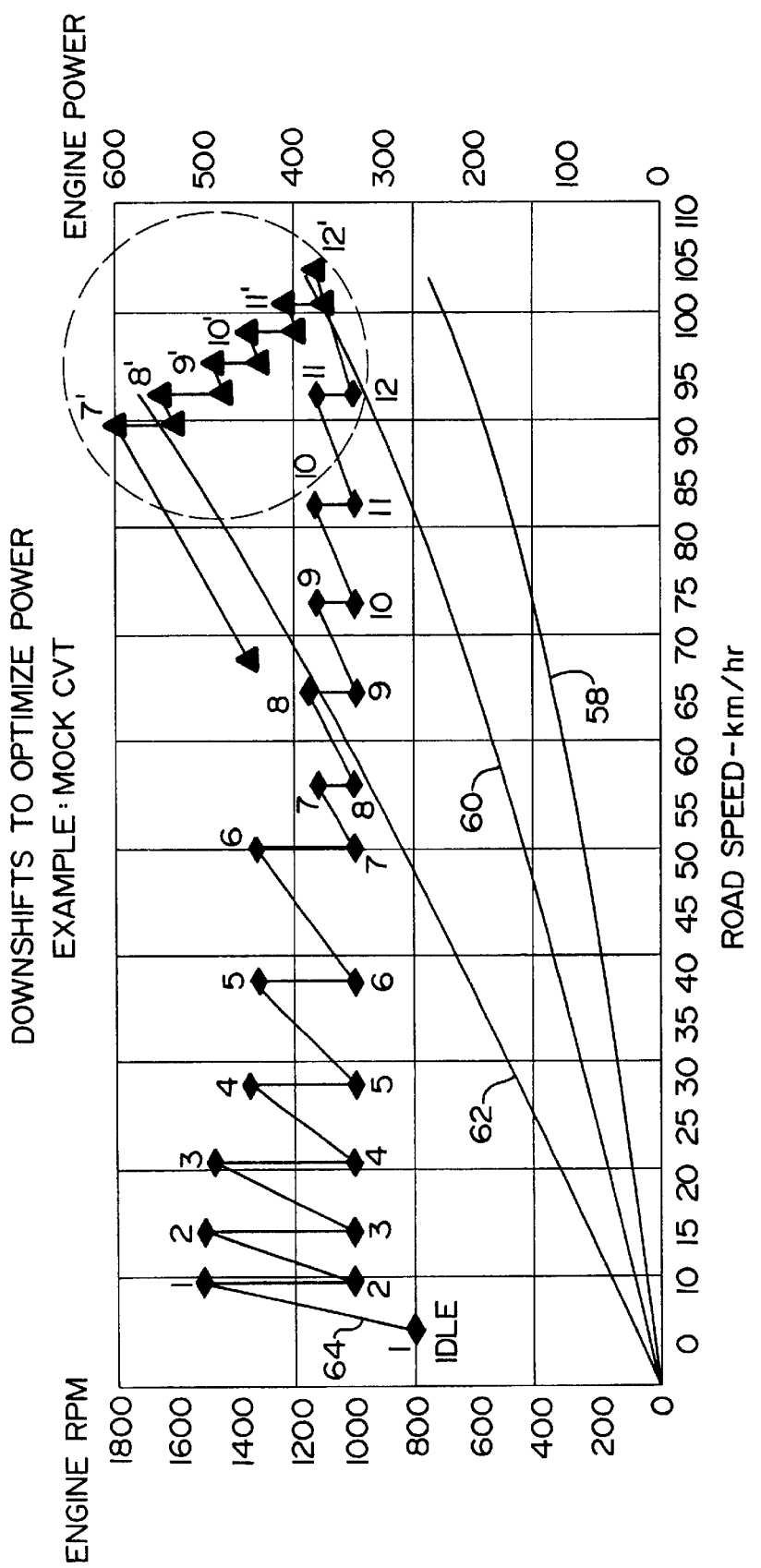
FIG. 7 is a shift strategy graph, particularly demonstrating downshifts in an optimal power/performance mode of the improved transmission operating system of the present invention.

Referring initially to FIG. 1, a vehicular power train 10, designed for use in a motor vehicle not shown, includes an engine 12 and an electronically actuated mechanical transmission 14. The engine 12 and transmission 14 are coupled together via an automatically actuated centrifugal clutch 16. The specific configuration of the power train 10 is particularly suitable for on-highway trucks, although the invention is broad enough to reach other vehicles as well.

The engine 12 incorporates an engine output shaft 18 that is operatively coupled to the front end 16A of the clutch 16, as those skilled in the art will appreciate. Coupled to the rear end 16B of the clutch 16 is a transmission input shaft 20; and a transmission output shaft 22 extends, in turn, from the opposite end of the transmission 14. The shaft 22 is coupled in a conventional manner to a differential of a transfer case (24).

Referring now also to FIGS. 2–4, an engine controller 26 has an engine signal transceiver 27 adapted for receiving commands from, and hence communicating with, a power train control module 36. Similarly, a clutch actuator 28 incorporates a signal receiver 29, and a transmission actuator 30 includes a signal receiver 31, both receivers adapted to communicate with the power train control module 36. The module 36 also provides command output signals 32 to the engine signal transceiver 27 for achievement of desired outputs. Specific command inputs are provided to the power train module 36 via a vehicle operator, and are converted into electric signals by an appropriate microprocessor, not shown. Finally, speed sensors 38, 40, and 42 of respectively noted shafts 18, 20, and 22 also provide appropriate data to the module 36, as well, to optimize real time data/response generation and power train performance.

In accordance with this invention, and referring now particularly to FIGS. 3 and 4, the vehicular power train 10 is influenced substantially by the operation of its electromechanical transmission 14. The transmission 14 is primarily controlled by the power train control module 36. However, the vehicle operator can influence performance and operation via manual manipulation of a transmission console 44 in the cab of the vehicle. To the extent that the transmission is envisioned to make actual shifts of gear ratios by automatic means, a driver will have only limited influence by selection generally of forward, reverse, and neutral gear selection positions displayed. However, the driver may have the additional capability, as shown, to "bump" the gearshift lever leftwardly or rightwardly to engage the next higher or next lower gear, respectively. Finally, a throttle position sensor 46 includes a pivotal throttle pedal 43 that provides a throttle position signal 45 to the power train control module 36 in a manner that will be appreciated by those skilled in the art.

Against this background, and referring now particularly to FIG. 5, a power curve, a torque curve, and fuel consumption curve are displayed in the stated order, each is graphed against engine rpm. It is to be recognized that each engine will have its own general set of performance characteristics, and that the data represented herein will have potentially substantial variation among engines.

Referring initially to the power curve, P, the amount of power represented along the vertical axis is displayed in kilowatts (kw), as shown to be within an exemplary range of 195 to approximately 350 kw. The horizontal axis represents engine rpm, as noted, and falls within a range of 1000 to approximately 1900 rpm. Characteristically, it will be observed that torque values T (measured in Newton-meters) will tend to decline at the higher end of the power range, which is associated with increased engine rpm as depicted. The bottom curve, F, represents fuel consumption measured in grams per kilowatt-hour. The fuel curve, as previously noted, is also measured against engine rpm. For the particular engine, the fuel consumption range falls within a relatively narrow band up until approximately 1600 rpm, and then increases measurably within the range of 1600 to 1800 rpm.

FIG. 6 provides a graph that integrates several of the aforedescribed relationships. Specifically, FIG. 6 provides a chart of a plurality of pear-shaped "fuel consumption islands", e.g. 50, that are superimposed over primary coordinates of engine torque vs. engine speed. The solid isobars F represent lines of constant fuel consumption, while dotted isobars P represent lines of constant power. The chart shows, in particular, an economy "sweet" spot 52 which represents fuel consumption and power demand values that are optimized for a given set of engine speed and engine torque values. Commensurately, the chart also demonstrates an optimized power "sweet" spot" 54 which represents commensurately higher fuel consumption and power demand values at slightly higher engine speed and greater engine torque values.

A path 56, represented as a rising dotted line, interconnects the two sweet spots, and represents a conventional blend zone, or a normal engine operating range that attempts to "balance" the distinct strategies of this invention as earlier noted. Thus, the graph is presented herein specifically to demonstrate the uniquely separate transmission gear ratio shift strategies of either maintaining optimal fuel economy or of maintaining optimal power demand, as will now be described.

At the outset, it is to be noted that the shift patterns to be described will vary depending on characteristics of specific engines employed in the power train 10. In addition, it is to be understood that for optimal fuel economy, all of shifts will be made in such a manner as to hover about the optimal fuel economy sweet spot 52. Conversely, all performance up-shifts and down-shifts will be sequenced in a manner to keep the engine close to maximum power demand. Obviously, hill-holding ability will be based upon respective torque and horsepower capacities, and thus the ability of a given engine to meet requirements under any given set of conditions. Finally, the strategies herein described are particularly suitable for mechanical transmissions with reduced ratios steps in upper gears.

Referring now to FIG. 7, a so-called "climbing the ladder" transmission gear change approach is demonstrated in a gear-shifting chart displaying engine rpm vs. road speed. Whenever vehicle engine loads become high, such as when a vehicle encounters significant hill climbing demands, the road speed of the vehicle will tend to diminish if the driver remains in the same gear. Thus, those skilled in the art will appreciate that it becomes necessary to downshift the gear ratios, which in turn forces engine rpm to become higher with each successive downshift (hence the expression "climbing the ladder"). To the extent that the smaller ratio changes are associated with the upper gears 7–12, the gear shift strategy of this invention provides a simulated performance of a continuously variable transmission whenever said transmission is operating in its upper gear ratios.

Figure 8:
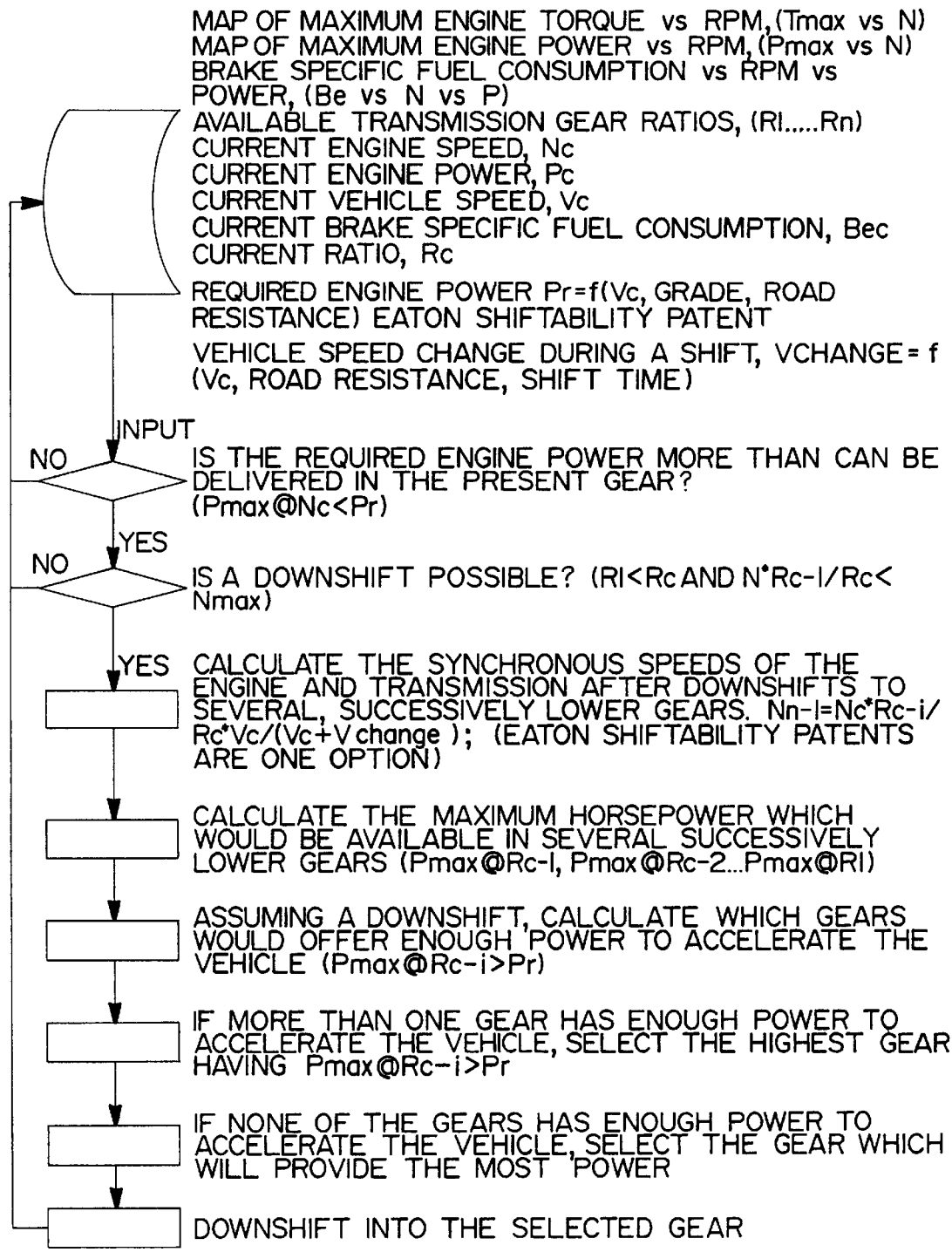
FIG. 8 is a shift strategy decision map associated with the shift strategy graph of FIG. 7, particularly demonstrating a sequence of event/decisions involved in making strategy downshifts in an optimal power/performance mode of the improved transmission operating system of the present invention.

An optimal power gear shifting chart and associated gear shifting strategy map are presented in FIGS. 7 and 8 to reflect a gear shifting strategy that seeks to optimize the power demand sweet spot 54, as previously identified in reference to FIG. 6. Superimposed on the chart are power demand curves 58, 60, 62. The curve 58 is a power curve reflective of the minimum power required to maintain speed on a relatively flat road. The curve 60 is reflective of a representative amount of power to maintain speed on a mild to moderate grade. Finally, the curve 62 reflects the minimal amount of power to maintain speed on a significant grade. Those skilled in the art will appreciate that for purposes of the examples provided herein, all of these representative values are relative.

The power demand curves 58, 60, 62 are mildly upwardly curved lines; the jagged curve 64 reflects a series of gear positions, shown in both diamond shaped and triangular shaped nodes. Each node represents a transmission gear position; the diamond shaped positions reflect gears 1 through 12 as actually economy shift points encountered on a flat road, whether accelerating or decelerating. The vertical segments between the respective gear positions represent gear ratio changes, or physical gear shifting as commanded by the strategy software. The so-called "climbing the ladder" portion of the chart is reflected by the shift changes contained within the dotted circle in the upper right hand corner of the chart. It will be apparent that as downshifts occur, e.g. upon encountering a significant hill grade, the engine power increases and road speed decreases commensurately. The strategy, however, provides that the engine will perform as closely as possible to the earlier described power sweet spot 54.

As a significant grade is encountered, a series of downshifts will be made sequentially from gear 12' to gear 11', then from 11' to gear 10', and so on. For relatively mild grades, the shift strategy will lower the gear ratios only as low as gear 7', thus shifting within the transmission between the relatively small ratio steps of the highest transmission gear ratios. Obviously up on a very significant grade, the transmission may have to be shifted into even lower gears, in order to be able to negotiate the grade. However the particular power optimization strategy is designed to function within the operational parameters described in at least eighty percent (80%) of anticipated hill grade encounters.

Referring particularly to the shift strategy decision map of FIG. 8, the necessary software inputs include data maps of maximum engine torque vs. rpm, maximum engine power vs. rpm, fuel consumption vs. rpm vs. power, and the available transmission gear ratios. In addition, the strategy reads and responds to inputs that include current throttle position and engine speed, current engine power, current vehicular speed, current brake specific fuel consumption, as well as current gear ratio selection. Fundamental to the strategy calculations is that the required engine power at any given point of operation is a function of current vehicular speed, current hill grade, and current road resistance, as indicated. Finally, vehicle speed changes during a given gear shift are a function of current throttle position, vehicle speed, road resistance, and time required for making the shift by the automatic transmission.

Based on the foregoing parameters, the actual strategy presented can be described in an exemplary manner as follows. Assume that the vehicle is traveling in steady-state fashion at approximately 105 kilometers per hour in its top ($12^{th}$) gear, on a relatively flat grade. Instantaneously, the vehicle encounters a relatively significant uphill grade, at which moment the vehicle begins to decelerate. To the extent that continued deceleration is objectionable, the driver would desire to maintain vehicle speed to the extent possible. This is achieved via a series of transmission downshifts.

As will be apparent from the above-referenced dotted circle region of FIG. 7, assuming that the vehicle has decelerated to a speed of approximately 102 kilometers per hour, the immediate shift strategy will call for a downshift from gear 12' to 11', thus reducing the speed from 102 kilometers per hour to approximately 98 kilometers per hour, per the chart of FIG. 7. Immediately, the engine rpm increases from approximately 1150 to 1200 rpm. Successive reductions in gear ratios, i.e. from 11' to 7', will further minimize speed losses until the vehicle speed reaches approximately 92 kilometers per hour, in the example presented, at which point the engine rpm will be at its indicated operating limit of 1800 rpm. Therefore, as earlier stated, so-called "climbing the ladder" shift changes increase engine speed, while erosion of vehicle speed is optimally minimized, as reflected by the shifts sequence displayed in the dotted circle portion of the upper right hand corner of the shift chart.

In summation, the transmission down-shift strategy optimizes engine power demand performance of a motor vehicle in which an optimal power transmission gear ratio has been established for each ground speed of the vehicle per given actual engine speed and torque values. The shift strategy includes the steps of:

a) selecting a next lowest gear ratio, based upon a target down-shift engine speed, whenever actual engine speed approaches a value below a target engine speed;

b) continuing selections of successive next lowest gear ratios based upon a series of lower target down-shift engine speeds in a manner that permits engagement of a next lowest gear ratio whenever actual engine speed approaches a value below a next successive lower target engine speed, and c) calculating a next optimal power transmission gear ratio prior to each successive down-shift.

Figure 9:
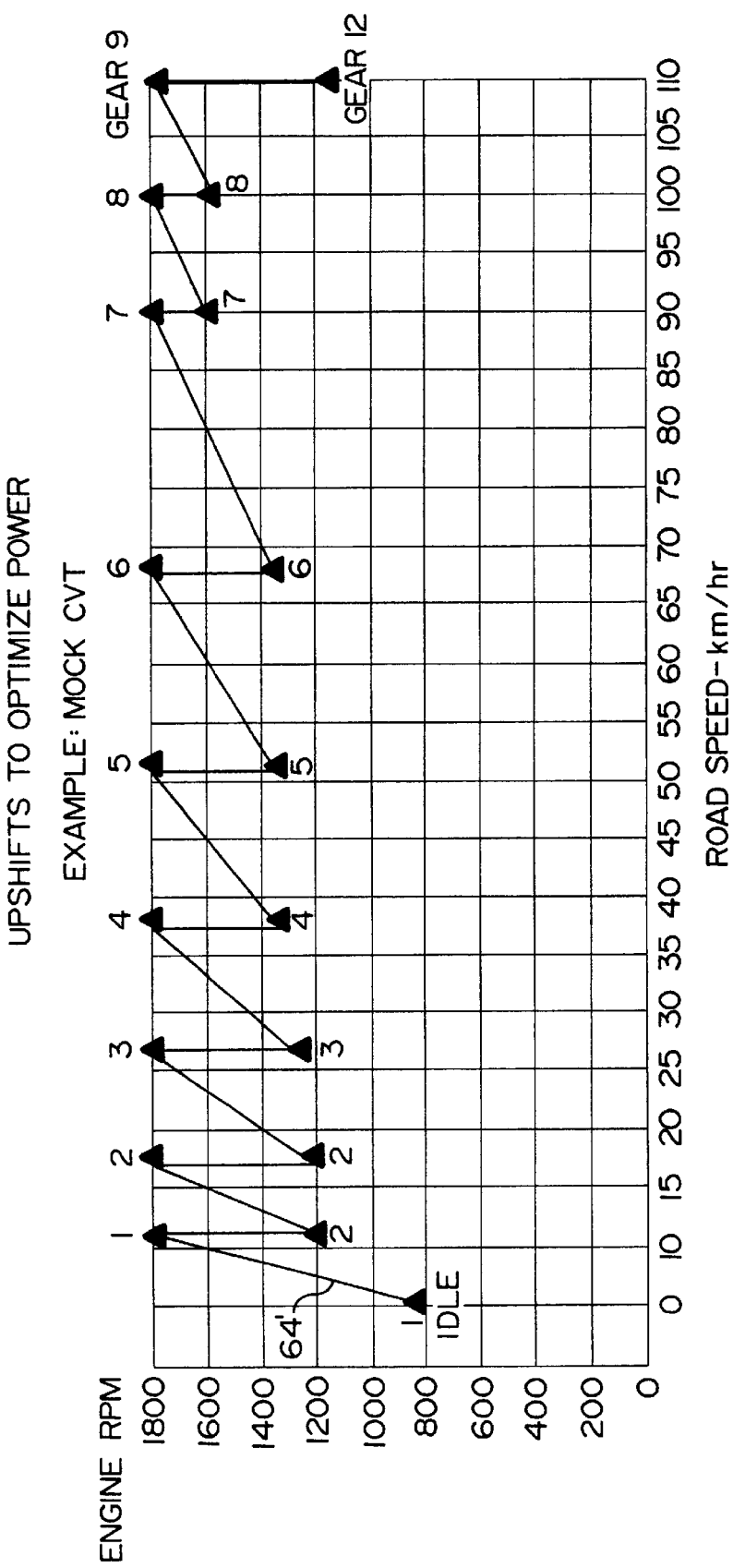
FIG. 9 is shift strategy graph, depicting up-shifts in an optimal power/performance mode of the improved transmission operating system of the present invention.
Figure 10:
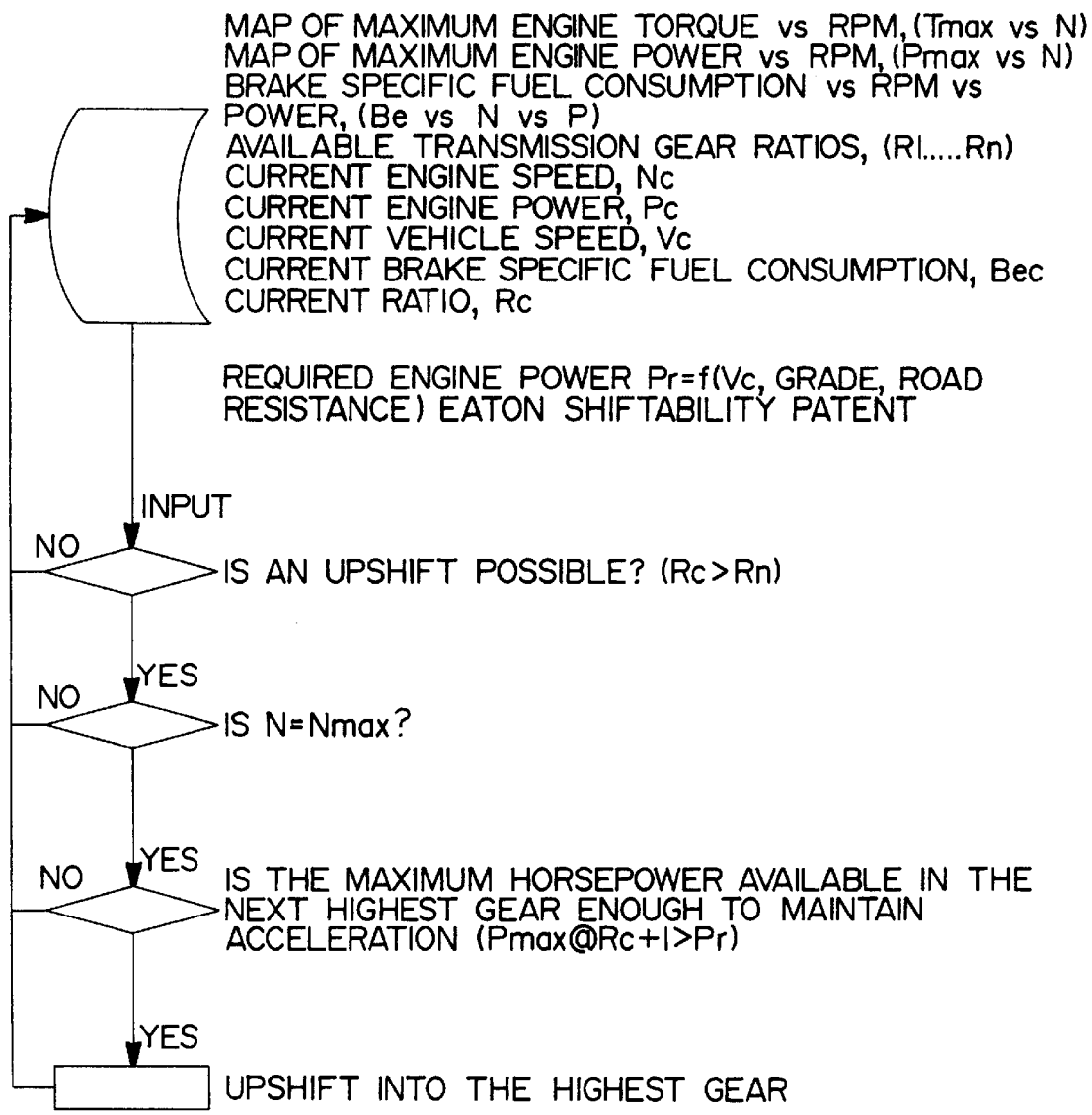
FIG. 10 is a shift strategy decision map associated with the shift strategy graph of FIG. 9, particularly demonstrating a sequence of event/decisions involved in making strategy up-shifts in an optimal power/performance mode of the improved transmission operating system of the present invention.

Referring now to FIGS. 9 and 10, another power shift chart and associated shift strategy decision map is presented to reflect a sequence of mock continuously variable transmission up-shifts under acceleration conditions. The particular mode of operation described is that which might be encountered, for example, when a vehicle is accelerating rapidly on a relatively flat surface, for example when a vehicle operator wishes to quickly pass another vehicle on a highway. Thus, referring to the shift sequence represented by the jagged shift curve 64', it is clear that the objective is the maintenance of the highest available engine power between all gearshifts. The particular shift sequence displayed reveals that, assuming that the vehicle is operating on a level surface or without encountering a significant hill grade, the operator would be able to maintain power performance at or continuously close to the sweet spot 54. The shift strategy would establish the timing of up-shifts in accordance with performance demand parameters. All shifts would be automatic, in accordance with the strategy, and of course without requirement of driver intervention or even thought.

Referring particularly to the up-shift strategy map of FIG. 10, the earlier data maps apply, and are contained within the software described in the previous strategy example. However, the flat road power strategy is modified from that described in reference to the significant uphill power strategy, in that the transmission is attempting to make power shifts upwardly while maintaining maximum power. Conversely, in accordance with the previously described significant hill grade example, the power shifts are made downwardly, so as to minimize losses of speed under significant power demand.

Figure 11:
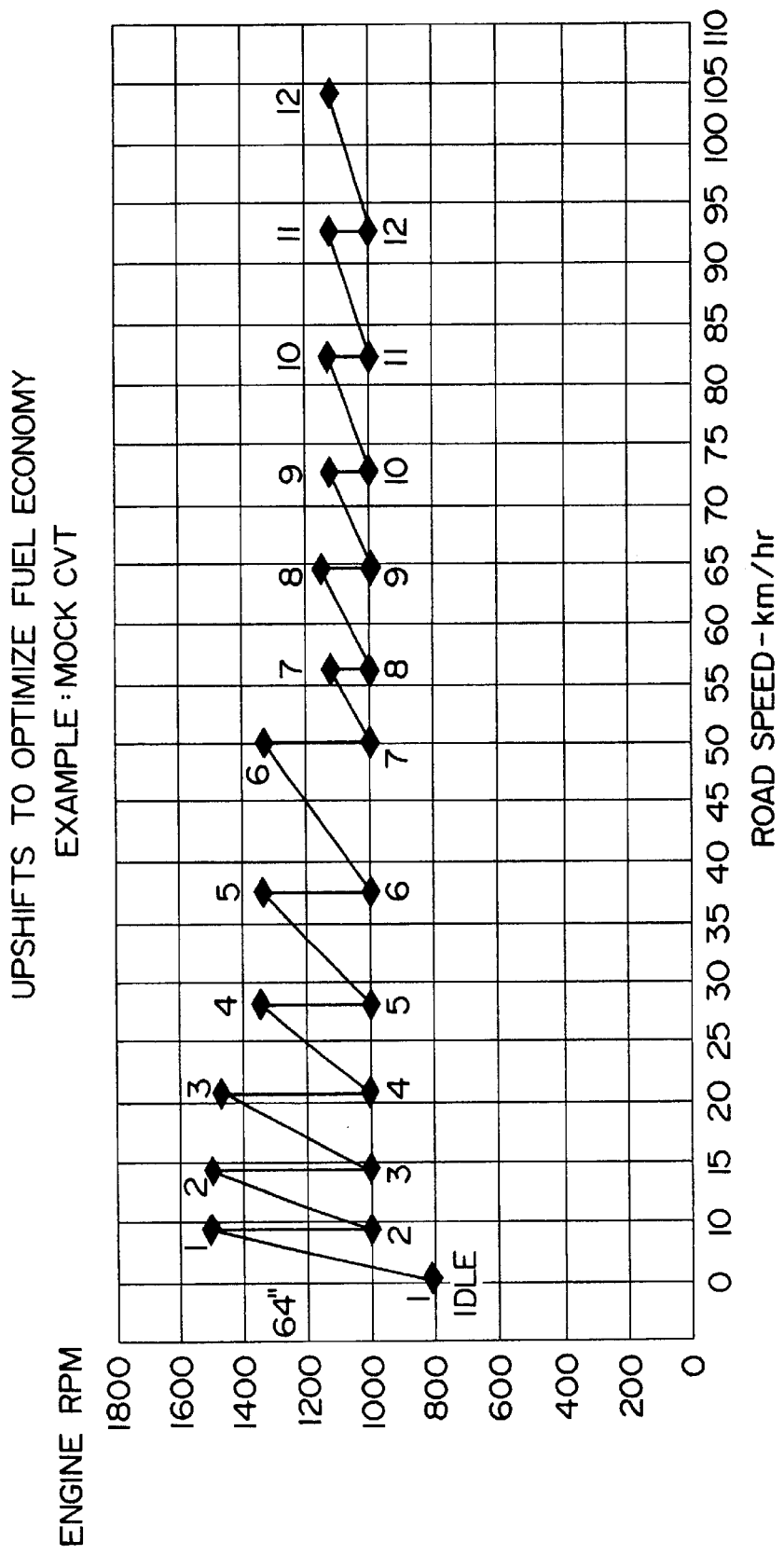
FIG. 11 is a shift strategy graph, depicting up-shifts in an optimal fuel economy mode of the improved transmission operating system of the present invention.
Figure 12:
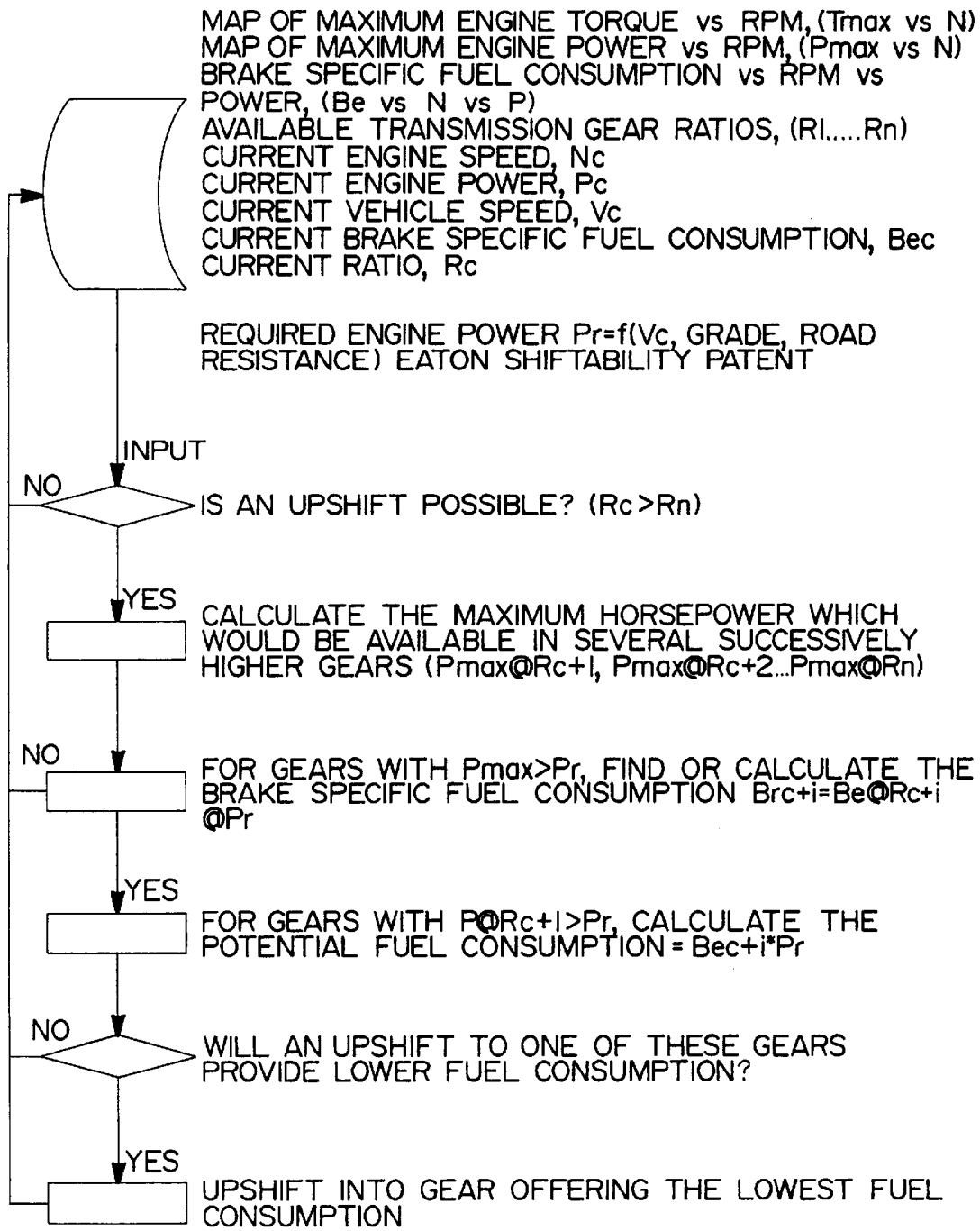
FIG. 12 is a shift strategy decision map associated with the shift strategy graph of FIG. 11, particularly demonstrating a sequence of event/decisions involved in making strategy up-shifts in an optimal fuel economy mode of the improved transmission operating system of the present invention.

Referring now to FIGS. 11 and 12, an economy up-shift strategy chart and associated shift strategy decision map is provided under conditions in which driver throttle demand is low. Conditions suitable for this strategy would also be relatively flat road surfaces or slight grade hills. Referring initially to the gear-shifting chart, the jagged shift curve 64" reflects an economy mode, wherein the optimal engine rpm range is maintained relatively low compared to the previously described power strategy. In a sense, this strategy is a bit more sophisticated, to the extent that rather than constantly striving for maximum engine rpm, the several fuel economy variables mapped into the strategy must be utilized in a manner to provide economy operation that attempts to hover around the fuel economy sweet spot 52, as previously described. Indeed, at the high-end gear ratios 7–12, the rpm is forced to stay within the range of 1000 to 1200 rpm in the example provided.

Referring particularly to the economy up-shift strategy decision map of FIG. 12, it will be noted that the decision points and processes of the strategy all reflect an effort to minimize fuel consumption while maintaining at least a forward minimally acceptable accelerating momentum of the vehicle. Those skilled in the art will appreciate the objectives involved in the separate strategies described.

Finally, the various strategies can be either separately utilized as described, or can be combined to substantially improve the overall performance of a vehicle. In a combined mode, the strategy would sense driving conditions to determine whether a fuel economy mode is appropriate, or whether a power mode is to be selected. For example, one combined strategy would enable a fuel economy strategy to be normally carried out as a default mode, which would be overcome when power demands were such that the economy sweet spot 52 could not be maintained, e.g. due to encountering a significant hill grade.

For example, one acceptable strategy would provide that any time the throttle position is very high, e.g. at least ninety-five percent (95%) wide open or higher, a mode toggle switch would automatically be reset to assure operation under the performance mode strategy. Whenever the throttle position is less than 95% wide open, the switch would be reset to assure economy mode. Thus, the mode switch would select between modes strictly on the basis of throttle position.

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

What is claimed is:

1. An electromechanical transmission up-shift strategy for optimizing engine fuel economy of a motor vehicle, wherein an optimal fuel economy transmission gear ratio has been established for each ground speed of said vehicle for given actual engine speed and torque values, said strategy including the steps of:

a) selecting a next highest gear ratio, based upon a target up-shift engine speed, whenever said actual engine speed approaches a value above said target engine speed;

b) continuing selections of successive next highest gear ratios based upon a series of higher target up-shift engine speeds in a manner that permits engagement of said next highest gear ratio whenever said actual engine speed approaches said higher value above said next successive higher target engine speed; and c) wherein said next gear ratio is calculated prior to each successive up-shift to provide optimal fuel economy.

2. The electromechanical transmission up-shift strategy of claim 1, wherein said strategy is employed in a transmission having shorter ratio steps between its highest gears than the ratio steps between its lowest gears.

3. The electromechanical transmission up-shift strategy of claim 2, wherein said strategy is based upon a function of driving conditions encountered; said conditions including at least a subset of engine torque, engine power, engine rpm, fuel consumption, vehicular speed, throttle position and currently selected transmission gear ratio.

4. The electromechanical transmission up-shift strategy of claim 3, wherein said strategy provides a simulated performance of a continuously variable transmission whenever said transmission is operating in its upper gear ratios.

5. An electromechanical transmission down-shift strategy for optimizing engine power demand performance of a motor vehicle, wherein an optimal power transmission gear ratio has been established for each ground speed of said vehicle for given actual engine speed and torque values, said strategy including the steps of:

a) selecting a next lowest gear ratio, based upon a target down-shift engine speed, whenever said actual engine speed approaches a value below said target engine speed;

b) continuing selections of successive next lowest gear ratios based upon a series of target down-shift engine speeds in a manner that permits engagement of said next lowest gear ratio whenever said actual engine speed approaches said lower value below said next successive target engine speed; and c) wherein said next gear ratio is calculated prior to each successive down-shift to provide optimal power transmission.

6. The electromechanical transmission downshift strategy of claim 5, wherein said strategy is employed in a transmission having shorter ratio steps between its highest gears than the ratio steps between its lowest gears.

7. The electromechanical transmission down-shift strategy of claim 6, wherein said strategy is based upon a function of driving conditions encountered; said conditions including at least a subset of engine torque, engine power, engine rpm, fuel consumption, vehicular speed, throttle position and currently selected transmission gear ratio.

8. The electromechanical transmission down-shift strategy of claim 7, wherein said strategy provides a simulated performance of a continuously variable transmission whenever said transmission is operating in its upper gear ratios.

9. An electromechanical transmission up-shift strategy for optimizing engine power demand performance of a motor vehicle, wherein an optimal power transmission gear ratio has been established for each ground speed of said vehicle for given actual engine speed and torque values, said strategy including the steps of:

a) selecting a next highest gear ratio, based upon a target up-shift engine speed, whenever said actual engine speed approaches a value above said target engine speed;

b) continuing selections of successive next highest gear ratios based upon a series of target up-shift engine speeds in a manner that permits engagement of said next highest gear ratio whenever said actual engine speed approaches said higher value above said next successive target engine speed; and c) wherein said next gear ratio is calculated prior to each successive up-shift to provide optimal power transmission.

10. The electromechanical transmission up-shift strategy of claim 9, wherein said strategy is employed in a transmission having shorter ratio steps between its highest gears than the ratio steps between its lowest gears.

11. The electromechanical transmission up-shift strategy of claim 10, wherein said strategy is based upon a function of driving conditions encountered; said conditions including at least a subset of engine torque, engine power, engine rpm, fuel consumption, vehicular speed, throttle position and currently selected transmission gear ratio.

12. The electromechanical transmission up-shift strategy of claim 11, wherein said strategy provides a simulated performance of a continuously variable transmission whenever said transmission is operating in its upper gear ratios.

13. An electromechanical transmission strategy for selectively choosing a shift strategy for a) optimizing engine fuel economy of a motor vehicle, or b) optimizing the engine power demand performance of a motor vehicle; wherein a) an optimal fuel economy transmission gear ratio has been established for each ground speed of said vehicle for given actual engine speed and torque values, or b) an optimal power transmission gear ratio has been established for each ground speed of said vehicle for given actual throttle position, engine speed, and torque values; said strategy including the steps of:

a) selecting a next appropriate gear ratio, based upon a target shift engine speed, whenever said actual engine speed approaches a value near said target engine speed;

b) continuing selections of successive next gear ratios based upon a series of target shift engine speeds in a manner that permits engagement of said next gear ratio whenever said actual engine speed approaches said next value near said next successive target engine speed; and c) wherein said strategy is a) responsive to selecting the optimal fuel economy mode, and calculates best fuel economy ratio prior to each next successive shift if driving conditions do not indicate power performance requirements, and is b) responsive to selecting the power mode, and calculates best power ratio prior to each next successive shift if driving conditions do not indicate economy performance is warranted.

14. The electromechanical transmission shift strategy of claim 13, wherein said strategy is employed in a transmission having relatively shorter ratio steps between its highest gears than the ratio steps between its lowest gears.

15. The electromechanical transmission shift strategy of claim 14, wherein said strategy is based upon a function of driving conditions encountered; said conditions including at least a subset of throttle position, engine torque, engine power, engine rpm, fuel consumption, vehicular speed, throttle position and currently selected transmission gear ratio.

16. The electromechanical transmission shift strategy of claim 15, wherein said strategy provides a simulated performance of a continuously variable transmission whenever said transmission is operating in its upper gear ratios.

17. An electromechanical transmission having multiple speed gears with smaller gear change ratios among its upper ratios than among its lower ratios, said transmission incorporating an up-shift strategy for optimizing engine fuel economy of a motor vehicle, wherein an optimal fuel economy transmission gear ratio has been established for each ground speed of said vehicle for given actual engine speed and torque values.

18. The electromechanical transmission of claim 17, wherein said strategy includes the steps of a) selecting a next highest gear ratio, based upon a target up-shift engine speed, whenever said actual engine speed approaches a value above said target engine speed;

b) continuing selections of successive next highest gear ratios based upon a series of higher target up-shift engine speeds in a manner that permits engagement of said next highest gear ratio whenever said actual engine speed approaches said higher value above said next successive higher target engine speed; and c) wherein said next gear ratio is calculated prior to each Successive up-shift to provide optimal fuel economy.

19. An electromechanical transmission having multiple speed gears with smaller gear change ratios among its Upper ratios than among its lower ratios, said transmission incorporating a down-shift strategy for opcimizing engine power demand performance of a motor vehicle, wherein an optimal power transmission gear ratio has been established for each ground speed of said vehicle for given actual engine speed and torque values.

20. The electromechanical transmission of claim 17, wherein said strategy includes the steps of:
   a) selecting a next lowest gear ratio, based upon a target down-shift engine speed, whenever said actual engine speed approaches a value below said target engine speed;
   b) continuing selections of successive next lowest gear ratios based upon a series of target down-shift engine speeds in a manner that permits engagement of said next lowest gear ratio whenever said actual engine speed approaches said lower value below said next successive target engine speed; and
   c) wherein said next gear ratio is calculated prior to each successive down-shift to provide optimal power transmission.

21. The electromechanical transmission shift strategy of claim 13, wherein a mode toggle switch is set between an economy mode and a performance mode based on throttle position.

22. The electromechanical transmission shift strategy of claim 21, wherein said throttle position is approximately 95%.

23. An electromechanical transmission strategy for selectively choosing a shift strategy for optimizing the engine power demand performance of a motor vehicle; wherein an optimal power transmission gear ratio has been established for each ground speed of said vehicle for given actual throttle position, engine speed, and torque values; said strategy including the steps of:
   a) selecting a next appropriate gear ratio, based upon a target shift engine speed, whenever said actual engine speed approaches a value near said target engine speed;
   b) continuing selections of successive next gear ratios based upon a series of target shift engine speeds in a manner that permits engagement of said next gear ratio whenever said actual engine speed approaches said next value near said next successive target engine speed; and
   c) wherein said next gear ratio is calculated prior to each shift to provide optimal power transmission.

24. The electromechanical transmission shift strategy of claim 23, wherein said shift strategy is at least one of an up-shift strategy and a down-shift strategy.

25. The electromechanical transmission shift strategy of claim 24, wherein said strategy comprises bath an up-shift strategy and a down-shift strategy.

26. The electromechanical transmission shift strategy of claim 24, wherein said strategy is employed in a transmission having shorter ratio steps between its higher gears than the ratio steps between its lowest gears.

27. The electromechanical transmission shift strategy of claim 24, wherein said strategy is based upon a function of driving conditions encountered; said conditions including at least a subset of engine torque, engine power, engine rpm, fuel consumption, vehicular speed, throttle position and currently selected transmission gear ratio.

28. The electromechanical transmission shift strategy of claim 24, wherein said strategy provides a simulated performance of a continuously variable transmission whenever said transmission is operating in its upper gear ratios.

29. The electromechanical transmission shift strategy of claim 23, wherein said strategy is responsive to selecting the power mode, and calculates best power ratio prior to each next successive shift if driving conditions do not indicate economy performance is warranted.

* * * * *